United States Patent Office 2,960,551
Patented Nov. 15, 1960

2,960,551

ISOMERIZATION PROCESS

Morris Feller, Park Forest, Ill., assignor to Standard Oil Company, Chicago, Ill., a corporation of Indiana No Drawing. Filed Feb. 27, 1958, Ser. No. 717,823

14 Claims. (Cl. 260—683.2)

This application relates to olefin isomerization and more particularly to a unique catalyst system and process employing such catalyst for isomerizing straight-chain terminal olefins, such as butene-1, to straight-chain internal olefins, such as butene-2.

As an end product and also as an intermediate product in various petroleum and petrochemical refining processes, internal olefins, that is, olefins with the double bond other than between carbon atoms at the terminus of a carbon chain, are preferred to terminal olefins, that is, olefins with the double bond between carbon atoms at the terminus of a carbon chain. For example, in the catalytic alkylation of isobutane with butenes to form high-octane components for blending into motor fuels and/or aviation gasolines, it has been found that alkylate produced using butene-2 as feed has a substantially higher research octane number than alkylate produced using butene-1.

Various processes are available for isomerizing terminal olefins to internal olefins, but such processes generally suffer from one or more limitations, such as, for example, unfavorable equilibrium conditions, excessive cracking of olefin, undesired polymerization of olefin, and the like. It is therefore an object of the present invention to provide a catalyst and process for the isomerization of straight-chain terminal olefins to internal olefins which are capable of operating at favorable equilibrium conditions, particularly temperature, and which do not result in excessive olefin cracking and/or polymerization. It is also an object of the present invention to provide a promoter for such a catalyst system and process. These and other objects of the present invention will become apparent as the detailed description proceeds.

The primary process condition limiting maximum conversion of terminal olefins to internal olefins is reaction temperature. This is illustrated in the following table showing approximate equilibrium percentages for butenes at various temperatures:

| Temp., °C | Butene-1, Wt. Percent | Butene-2, Wt. Percent | | |
|---|---|---|---|---|
| | | Cis | Trans | Total |
| 60 | 5 | 23 | 72 | 95 |
| 150 | 11 | 28 | 61 | 89 |
| 300 | 16 | 33 | 51 | 84 |

Thus, it can be seen that the lower the temperature the higher the potential conversion of butene-1 to butene-2. The present invention takes advantage of the favorable equilibrium at low temperature by means of a novel catalyst and process wherein maximum conversions are achieved at temperatures below 100° C., e.g., about 20 to 100° C.

To isomerize straight-chain terminal olefins to straight-chain internal olefins in accordance with the present invention, I employ a catalytic medium consisting essentially of a solution, in phosphorus oxychloride, of a halogen-containing noble metal compound, the noble metal of said noble metal compound being selected from the group consisting of platinum, palladium, and mixtures thereof. In carrying out the novel process of the present invention, the straight-chain terminal olefin or olefins to be isomerized are contacted with the novel catalytic medium above described and the resulting internal olefin separated therefrom by ordinary means, such as, for example, flashing, distillation, decantation, and the like. The invention is advantageously employed to convert such terminal olefins as butene-1, pentene-1, hexene-1, heptene-1, octene-1, nonene-1, decene-1, undecene-1, dodecene-1, and the like.

Examples of halogen-containing noble metal compounds which are advantageously employed in practicing the invention are chloroplatinic acid ($H_2PtCl_6 \cdot 6H_2O$), platinum tetrachloride ($PtCl_4$), platinous chloride ($PtCl_2$), and palladium chloride ($PdCl_2$ and/or $PdCl_2 \cdot 2H_2O$). Further, but not necessarily equivalent noble-metal compounds which may be employed include platinic fluoride, platinic bromide, platinous bromide, platinic iodide, platinous iodide, palladium fluoride, palladous bromide, palladium iodide, and the like. In general, I prefer to form a solution of the halogen-containing noble metal compound in the phosphorus oxychloride ($POCl_3$) and thereafter use this catalytic medium for contacting the terminal olefin to be isomerized. Alternatively, the olefin may be separately contacted with either the halogen-containing noble metal compound or with the phosphorus oxychloride and thereafter the other constitutent added. For example, I may first add the olefin to the halogen-containing noble metal compound and thereafter add phosphorus oxychloride.

Effective conversions may be carried out at ambient temperatures, e.g., about 20° C. or higher. The upper temperature is limited only by decomposition considerations which, in general, may be ignored since substantially lower temperatures are preferred to take advantage of more-favorable equilibrium conditions. Thus, to operate under favorable equilibrium conditions and to obtain maximum conversion, the preferred temperature range is about 25 to 100° C., optimally 40 to 80° C. Atmospheric pressure and pressures higher or lower than atmospheric may also be used. When carrying out the process batchwise, I prefer to use sufficient pressure to maintain the olefin as a liquid so that both the catalyst and the olefin are in a liquid-like phase. Thus, in the case of butenes, for example, pressures of at least about 3–5 atmospheres are normally employed. It should be understood, however, that it is only necessary that the catalytic medium be in the liquid phase since satisfactory conversions may be obtained by the simple technique of bubbling gaseous olefin through the catalytic medium. In general, I prefer to operate the system at pressures in the range of about 1 to 20 atmospheres.

If the terminal olefin, the halogen-containing noble metal compound, and phosphorus oxychloride are present, some olefin isomerization generally results regardless of the relative proportions or concentrations of each. In practice, however, I prefer to use concentrations of the halogen-containing noble metal compound above about 0.01 mol percent, based on olefin, usually about 0.1 to 10 mol percent, and optimally 0.2 to 2 mol percent. At least about 5 mols of phosphorus oxychloride per mol of the noble metal compound are usually employed, preferably about 10 to 1000 mols, and optimally about 20 to 100 mols.

Contact time is usually governed by the degree of isomerization desired, and usually is substantially in excess of about 1 second. When bubbling gaseous olefin through the catalytic medium, isomerized product is almost immediately detected in the gaseous effluent. When operating batchwise, however, a first-cycle induction period, which is believed to be associated with formation of a complex, may be encountered. In some instances, the induction period may take at least several hours before any significant conversion results. The weight hourly space velocity (i.e., weight of olefin per hour per unit weight of noble metal compound) may vary from about 0.1 to 1000. For economic operation, however, space velocity should be at least above about 1, and preferably above 10. Economic operation requires substantially complete recovery of platinum from spent catalytic medium and such recovery can be effected by conventional techniques known to the art, such as, for example, precipitating the platinum by hydrogen treating at elevated temperature (e.g., 100° C.) and recovering platinum from the precipitate.

In a particularly advantageous embodiment of the present invention, it has been discovered that first-cycle induction period may be minimized and reaction rate increased by addition to the reaction zone of water or an aliphatic alcohol promoter, such as, for example, methanol, ethanol, propanol, butanol, and the like. Mixtures of water and aliphatic alcohols, or of various aliphatic alcohols may, of course, be employed. The promoter may be added at any point, that is, to the olefin, to the noble metal compound, to the phosphorus oxychloride, to the solution of the noble metal and phosphorus oxychliride, to the complex of the olefin and the noble metal compound in the presence or absence of the phosphorus oxychloride, and the like. In general, it is preferred to add the promoter prior to complex formation in the first cycle so that the promoter is immediately available to minimize the induction period. For significant promotion, at least about 1 mol of promoter is required per mol of the noble metal compound. I prefer to use about 1 to 100 mols of promoter per mol of noble metal compound, and optimally about 1 to 20 mols of promoter per mol of noble metal compound when employing water as promoter and about 5 to 50 mols of promoter per mol of noble metal compound when employing an aliphatic alcohol as promoter.

It is believed that the olefin to be converted and the halogen-containing noble metal compound form a complex or liquid-like complex structure which may be the same as or similar to the complexes described by the art (e.g., "Coordination Compounds of Platinous Halides with Unsaturated Substances," Kharasch and Ashford, JACS, 58, 1736 (1936)). The phosphorus oxychloride appears to act in the nature of a co-catalyst solvent which adjusts the stability of the noble-metal-halogen-olefin complex such that a terminal olefin enters the complex while an internal olefin is released from the complex at approximately the same rate, said rate being feasibly operative, i.e., substantial isomerization in less than about a week. In the embodiment wherein water and/or aliphatic alcohol is used as a promoter, it is submitted that such promoter initially speeds up the rate of complex formation and/or increases the rate at which the phosphorus-oxychloride-stabilized-complex takes in terminal olefins and releases internal olefins. The above theory is, of course, presented as one possible explanation of the invention, and I do not necessarily wish to be bound or limited thereby. Regardless of the mechanism, I have found that contacting of a straight-chain terminal olefin with a solution of a halogen-containing noble metal compound in phosphorus oxychloride results in isomerization of the olefin to an internal olefin.

In carrying out my invention I prefer to use chloroplatinic acid as the halogen-containing noble metal compound and water as the promoter. As previously pointed out, preferred temperatures are in the range of about 25 to 100° C. and pressures in the range of about 1 to 20 atmospheres.

The invention will be more clearly understood from, and illustrated by, the following specific examples.

Example I

In this example a series of isomerization runs were made using both chloroplatinic acid and platinum tetrachloride as the halogen-containing nobel metal compound, which in the presence of phosphorus oxychloride acted as the catalytic medium. Further tests were also made in the absence of the noble metal compound to serve as a blank run for comparison.

All runs in this series were carried out at atmospheric pressure using butene-1 in the gaseous phase as the feed stock. In the first set of runs 1 gram of platinum tetrachloride was commingled with 17 grams of phosphorus oxychloride and butene-1 bubbled through the resulting solution at temperatures ranging from about 25 to 60° C. In the second set of runs 1 gram of chloroplatinic acid was commingled with 17 grams of phosphorus oxychloride and butene-1 bubbled through the resulting solution at temperatures ranging from about 50 to 60° C. In the third set of runs the butene-1 was bubbled through 17 grams of phosphorus oxychloride in the absence of any halogen-containing noble metal compound. The results were as follows:

| Medium | Temp., °C. | Conversion to Butene-2, Percent of Equilibrium |
|---|---|---|
| $PtCl_4$ in $POCl_3$ | 25–60 | 20–70 |
| $H_2PtCl_6 \cdot 6H_2O$ in $POCl_3$ | 50–60 | 82–93 |
| $POCl_3$ alone | 25–100 | 0 |

Data in the above table clearly illustrate the substantial conversion of butene-1 even when the butene-1 is introduced as a gas. When higher pressures are used to maintain the olefin in the liquid phase, even higher conversion often results, as will be illustrated hereinafter.

Example II

A series of runs were made to show the effects of omitting either the halogen-containing noble metal compound or the phosphorus oxychloride as compared with results obtained when both are present. In all runs, contacting of the olefin was carried out in liquid phase at about 6 atmospheres and 60° C. Product, containing the isomerized olefin, was separated by flashing at atmospheric pressure. The results were as follows:

| Catalyst | | Butene-1, ccs. | Time, Hours | Conv. to Butene-2, Percent of Equilibrium |
|---|---|---|---|---|
| Grams of $H_2PtCl_6 \cdot 6H_2O$ | Grams of $POCl_3$ | | | |
| 2 | 0 | 60 | 20 | <5 |
| 0 | 34 | 30 | 21 | <5 |
| 1 | 17 | 30 | 12 | 99 |

The above data clearly show that without the catalytic medium of the present invention, the system is substantially inoperative.

Example III

A series of runs were made wherein the same catalytic medium was used over and over again and butene-1 was employed as feed. The butene-1 was maintained in liquid phase by using a closed reaction vessel at pressures in the range of about 6 atmospheres. The catalytic medium was prepared by dissolving 1 gram of chloroplatinic acid in 17 grams of phosphorus oxychloride. For each cycle 30 ccs. of butene-1 were contacted with the catalytic medium at 60° C. An induction period of about 4 to 5 hours was required at the beginning of the first cycle before any appreciable isomerization occurred. In the fourth cycle 0.4 ccs. of water was added to the contacting step as a promoter. In all cases the product, containing the isomerized olefin, was separated by flashing at atmospheric pressure. The results are as follows:

| Cycle | Promoter | Time after Induction to Reach 90% of Equilibrium, Hours | Ultimate Conv. to Butene-2, Percent of Equilibrium |
|---|---|---|---|
| 1 | None | 5.2 | 99–100 |
| 4 | Water | 3.0 | 99–100 |

The above data show that the isomerization system is capable of achieving essentially 99 to 100 percent of theoretical equilibrium. The second and third cycles (not shown) each proceeded at a slightly slower rate than the first cycle. When the water promoter was added in the fourth cycle, however, the reaction rate, as measured by the time to reach 90 percent of theoretical equilibrium, was clearly increased.

*Example IV*

In this run palladous chloride ($PdCl_2 \cdot 2H_2O$) was used as the complex-forming, halogen-containing noble metal compound. The catalytic medium was prepared by adding 0.4 gram of palladous chloride to 17 grams of phosphorus oxychloride. The resulting solution was then used to contact 30 ccs. of butene-1 in the liquid phase at about 6 atmospheres and 60° C. Product, containing isomerized olefin, was separated by flashing at atmospheric pressure. The results were as follows.

| Time, hours: | Conv. to butene-2, percent of equilibrium |
|---|---|
| 0–4 | Induction period |
| 9 | 3 |
| 21 | 20 |
| 25 | 25 |
| 50 | 46 |
| 71 | 60 |
| 95 | 73 |
| 116 | 77 |

It will be noted that the induction period required 4 to 5 hours, but that after the induction period, isomerization proceeded at a substantially constant rate.

*Example V*

To illustrate how promoters may be used to minimize induction periods and to increase reaction rates, a series of runs with different promoters were made using platinum tetrachloride, which is noted in the present catalyst system for lengthy induction periods and slow reaction rates. For each run the catalytic medium was prepared by dissolving 0.66 gram of platinum tetrachloride in 17 grams of phosphorus oxychloride. In each run 30 ccs. of butene-1 were contacted with the catalytic medium at about 6 atmospheres and 60° C. About 0.4 ccs. of water or 0.5 ccs. of alcohol were employed as promoters. Product, containing isomerized olefin, was separated by flashing at atmospheric pressure. The results are as follows:

| Promoter | Induction Period Hours | Hours after Induction to Reach: | | Ultimate Conv. to Butene-2, Percent of Equilibrium |
|---|---|---|---|---|
| | | 30% of Equi. | 95% of Equi. | |
| None | 50–60 | 67 | | |
| Methanol | 14 | 3 | 9 | ≥97 |
| Ethanol | 3.5 | 5 | 18 | ≥97 |
| Water | 3 | 5 | 16 | 100 |

These data illustrate that by use of promoter the induction period may be cut to less than 25 percent of the induction period without promoter. Reaction rates may also be increased by as much as 10 fold.

*Example VI*

This example illustrates utility of the present invention for isomerizing octene-1 to internal octene and/or for preparing an internal alcohol from a terminal olefin. The catalyst was prepared by dissolving 1 gram of chloroplatinic acid in 17 grams of phosphorus oxychloride. The resulting medium was then used to contact 30 ccs. of octene-1 at about 60° C. and essentially atmospheric pressure for about 16 hours. Isomerization to internal octene exceeded at least 50 percent of equilibrium with most of the internal olefin characterized by the trans structure. Internal olefin is then converted to secondary alcohols by usual hydrolysis techniques, e.g., contacting with aqueous acids, and the like.

While the invention has been described in connection with certain specific embodiments it is to be understood that such embodiments are illustrative only, and not by way of limitation. Numerous additional embodiments of the invention and alternative manipulative techniques and operating conditions will be apparent from the foregoing description to those skilled in the art. It should be understood, for example, that while the catalytic medium is a non-solid liquid and/or a liquid-like complex, it could be held within the pores of a solid material so that in a continuous process the flowing olefins would not sweep along the catalytic medium.

Having thus described the invention in detail, what is claimed is:

1. A catalyst for isomerizing straight-chain terminal olefins to straight-chain internal olefins consisting essentially of a solution of a halogen-containing noble metal compound in phosphorus oxychloride, the noble metal of said noble metal compound being selected from the group consisting of platinum, palladium, and mixtures thereof.

2. The catalyst of claim 1 wherein said noble metal compound is chloroplatinic acid.

3. The catalyst of claim 1 wherein said noble metal compound is platinum tetrachloride.

4. The catalyst of claim 1 wherein said noble metal compound is platinous chloride.

5. The catalyst of claim 1 wherein said noble metal compound is palladous chloride.

6. A process for isomerizing a straight-chain terminal olefin to a straight-chain internal olefin which comprises contacting the terminal olefin with a solution of a halogen-containing noble metal compound in phosphorus oxychloride, the noble metal of said noble metal compound being selected from the group consisting of platinum, palladium, and mixtures thereof; and separating the resulting internal olefin therefrom.

7. The process of claim 6 wherein said noble metal compound is chloroplatinic acid.

8. A process for isomerizing a straight-chain terminal olefin to a straight-chain internal olefin which comprises contacting the terminal olefin at a temperature above about 20° C. with above about 0.01 mol percent, based on olefin, of a solution of a halogen-containing noble metal compound, the noble metal of said noble compound being selected from the group consisting of platinum, palladium, and mixtures thereof, and about 5 to 5000 mols of phosphorus oxychloride per mol of noble metal compound; and separating the resulting internal olefin therefrom.

9. The process of claim 8 wherein said noble metal compound is chloroplatinic acid.

10. A process for isomerizing a straight-chain terminal olefin to a straight-chain internal olefin which comprises contacting the terminal olefin at a temperature of about 25 to 100° C. with about 0.01 to 10 mol percent, based on olefin, of chloroplatinic acid in the presence of about 10 to 10000 mols of phosphorus oxychloride per mol of chloroplatinic acid; and separating the resulting internal olefin therefrom.

11. A process for isomerizing butene-1 to butene-2 which process comprises contacting butene-1 with a liquid solution of a chlorine-containing noble metal compound dissolved in phosphorus oxychloride at a temperature in the range of about 25 to 60° C. and a pressure in the range of about 1 to 6 atmospheres, the mol ratio of said compound to said butene-1 being in the range of about 0.006, the mol ratio of said phosphorus oxychloride to said compound being in the range of about 60, and thereafter separating butenes from said compound and said phosphorus oxychloride.

12. The process of claim 11 wherein said compound is platinum tetrachloride.

13. The process of claim 11 wherein said compound is chloroplatinic acid.

14. The process of claim 11 wherein said compound is palladous chloride.

References Cited in the file of this patent

UNITED STATES PATENTS

| | | |
|---|---|---|
| 2,336,600 | Fawcett | Dec. 14, 1943 |
| 2,781,323 | Hunter | Feb. 12, 1957 |
| 2,804,490 | Belden | Aug. 27, 1957 |
| 2,861,960 | De Boer et al. | Nov. 25, 1958 |

OTHER REFERENCES

Berkman et al.: Catalysis (1940), pub. Reinhold Pub. Corp., New York, New York, pg. 749.